United States Patent [19]

Jaeger

[11] 3,751,685

[45] Aug. 7, 1973

[54] REDUNDANT PULSE SUPPLY SYSTEM

[76] Inventor: Hannes Jaeger, Am Buchet 24, 8021 Joking, Germany

[22] Filed: Dec. 2, 1971

[21] Appl. No.: 204,232

[30] Foreign Application Priority Data

Dec. 4, 1970 Germany .................. P 20 59 797.1

[52] U.S. Cl. ................. 307/219, 307/232, 307/262, 307/269, 307/296, 328/152, 328/60

[51] Int. Cl. ............................................ H02h 7/20

[58] Field of Search .................... 307/219, 260, 265, 307/293, 232, 262, 269, 296; 328/60, 62, 152

[56] References Cited

UNITED STATES PATENTS 3,628,158 12/1971 Sjoquist ......................... 307/219 X

*Primary Examiner*—John S. Heyman
*Attorney*—Harold J. Birch et al.

[57] ABSTRACT

A pulse supply system of the type having parallel-operating, like constructed pulse generating units is described. One unit functions as the active unit, while the other is a reserve unit with the posibility of switching between these states. Each of the duplicate pulse generators contains one stage of a bistable circuit, at the output of which is available an unambiguous signal indicative of the state of each pulse generator. A signal emitter is available in each pulse generating unit for producing an output indicative of the state of the applicable pulse generating unit; the signal emitters being conditioned by the bistable circuit. An evaluation circuit for each output pulse phase is present in the circuit receiving the pulses; this circuit receives both the signal emitter outputs and the pulse supply outputs. The evaluation circuit forwards only the pulse from the generator indicated as being in the active state.

10 Claims, 9 Drawing Figures

REDUNDANT PULSE SUPPLY SYSTEM

BACKGROUND OF THE INVENTION

This invention relates to pulse supply systems having duplicate pulse generating units of like construction, which are connected to operate in parallel, and in particular, to those systems which have the capability of alternately rendering the individual pulse generating units operative.

These are numerous applications for signal supply systems which have pulse waveform outputs, and these applications require pulse waveforms of a variety of parameters. Such signal supply systems might be found in a computer-controlled system.

Considerable demands are placed on the pulse supply in electrical systems, especially when one is dealing with systems involving pulse-controlled processes. To increase the reliability of such pulse supplies, it is known to duplicate the equipment for generating the pulse so that with the loss of one pulse generating unit the other unit is switched on. When both pulse generating units operate independently of each other, i.e., when the current supply equipment and the transmission lines are separated from each other, respectively, the reliability achieved thereby is sufficient, since it is improbable that both pulse generating units would fail simultaneously.

In a pulse supply system having pulse generating units constructed in the same manner and operating in parallel, though, there arises the problem of switching from one active pulse generating unit to the other pulse generating unit which is present as a reserve unit. In the receiving equipment to be supplied with a pulse an unambiguous signal must be present to indicate which of the two pulse generating units is operating as the active pulse generating units. Further, it must be assured that no interfering loss of pulse arises through a switching from one pulse generating unit to the other. The last mentioned problem is namely one of switching on the pulse generating unit, previously acting as a reserve, in the correct phase, i.e., starting with a complete pulse, after a changeover is triggered.

Another problem connected with the pulse unit change-over lies in the fact that time delay differences cannot be avoided on the pulse transmission paths. Even with exactly equal line lengths, after a changeover there result more or less interfering time delay difference, dependent upon the parts of the apparatus present, such as gates and amplification circuits, which can lead to errors, especially with very short pulses.

It is an object of this invention to provide a pulse power supply system having duplicate pulse generating units which overcomes the aforementioned problems.

SUMMARY OF THE INVENTION

In accordance with the principles of this invention, the foregoing and other objects are achieved by attaching to each pulse generating unit one stage of a bistable circuit, at the outputs of which an unambiguous signal for the active state or the reserve state of a pulse generating unit is available. A signal emitter is present in each pulse generating unit. The signal emitter is conditioned over the outputs of the bistable circuit and can be controlled by one of the pulse phases. At the signal emitter output, the signal denoting the state of the applicable pulse generating unit is available in the form of a prepatory signal. An evaluation circuit is present in the pulse receiving unit being supplied, for each pulse phase, which carries the pulse, as well as the conditioning signals of both pulse generating units, and which forwards only the pulse transmitted by the pulse generating unit designated as active unit, over pulse amplification units to the individual pulse gate inputs.

BRIEF DESCRIPTION OF THE DRAWINGS

The invention will be best understood by reference to the description of a preferred embodiment thereof given hereinbelow in conjunction with the drawings wherein.

Figure 1:
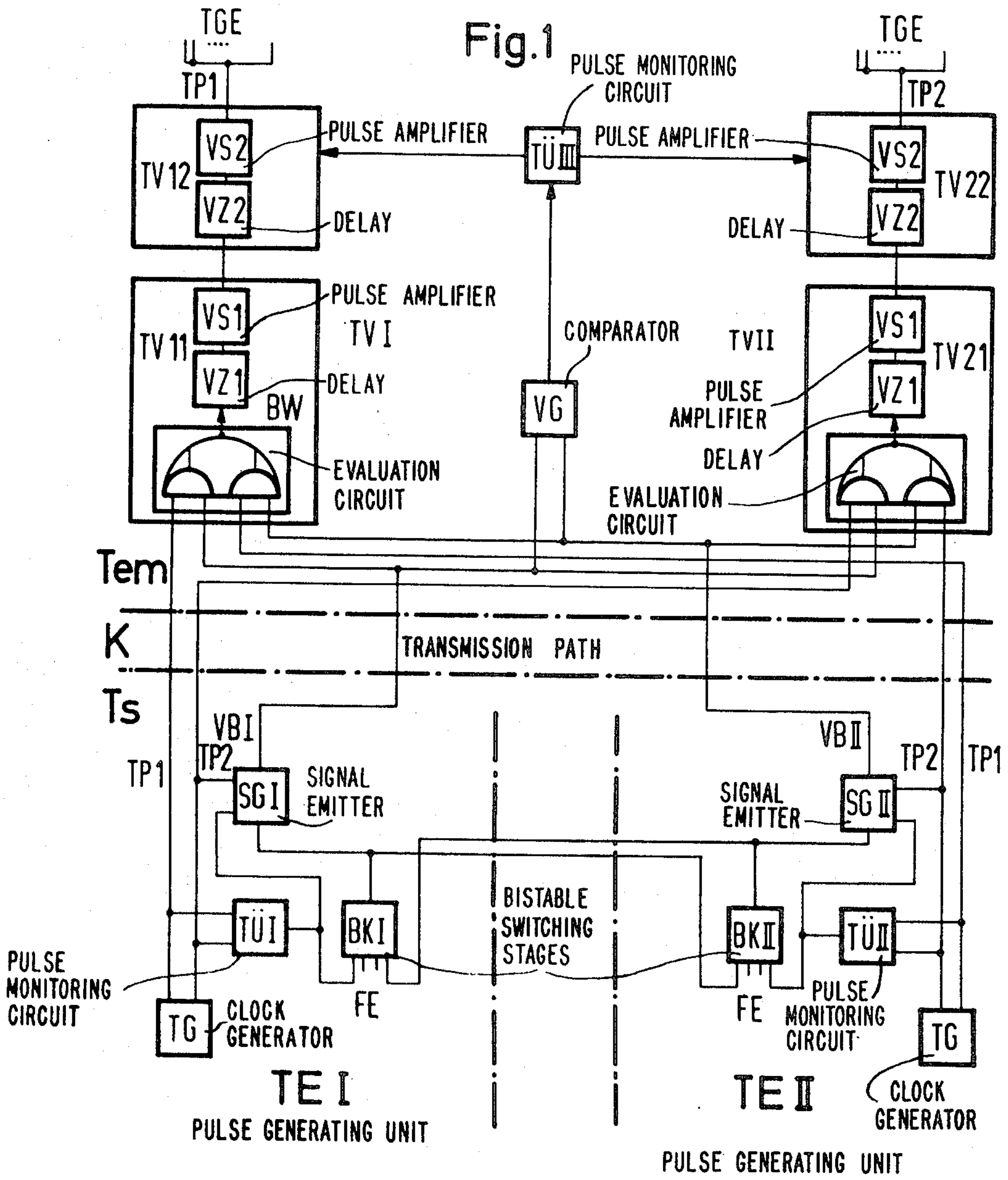
FIG. 1 is a schematic diagram of a preferred embodiment of a pulse supply system in accordance with the invention.

DETAILED DESCRIPTION OF THE DRAWINGS:

Referring to FIG. 1, the pulse supply system contains in the transmitter Ts the two pulse generating units TEI and TEII. Both pulse generating units are constructed in the same manner, i.e., a pulse emitter or clock generator TG, a pulse monitoring circuit TUI, TUII and a signal emitter SGI and SGII are present in both. A suitable construction for clock generator TG will be found in U.S. Pat. No. 3,383,525. The pulse monitoring circuits TU are described in greater detail hereinbefore in connection with FIG. 8. The signal emitters SG are of like construction and are described hereinbelow in connection with FIG. 2. In accordance with the invention, each pulse generating unit TEI and TEII contains, respectively, one stage of a bistable circuit. In the pulse generating unit TEI the stage is denoted with BKI, and in the pulse generating unit TEII, it is denoted with BKII. The bistable relationship results, as explained later in detail, from the fact that theoutput of one stage is coupled back to the input of the other stage of the bistable circuit.

The pulse generated by the pulse emitters TG, in the example the pulse phases TP1 and TP2, along with a conditioning signal VBI and VBII, which will be dealt with later, are transmitted over the transmission path K to the pulse receiving equipment Tem. The latter contains pulse amplifiers, the member of which varies according to the number of pulse phases to be transmitted. In the example of FIG. 1, in which two pulse phases; namely, TP1 and TP2 are transmitted, two pulse amplfiers TVI and TVII are present. TVI and TVII are described in greater detail hereinbelow in connection with FIGS. 4 through 7. Each pulse amplifier can contain a series of pulse amplification stages for further distribution of the pulse. In FIG. 1, these are denoted with TVII, TV12, i.e., TV21, TV22.

In an evaluation device or waiting circuit BW, which can be a component of the first pulse amplifier stage TV11, i.e., TV21, on the basis of the conditioning signals VBI and VBII denoting the state of the bistable circuit at the transmitter, it is recognized, which of the pulse generating units is to be viewed as the active pulse generating unit and which operates as reserve unit. The waiting circuit is merely a logic circuit of conventional construction, and it is described in greater detail hereinbelow. The pulse phases transmitted by the active pulse generating unit are forwarded over a delay circuit VZ1 and an amplification circuit VS1 to the following pulse amplification stage TV12 or TV22. It contains, in turn, a delay circuit VZ2 and an amplification circuit VS2. In the example shown here the inputs TGE of the individual pulse gates in the system unit to be supplied are reached over the output of the pulse amplification stage TV12, or TV22. To each pulse receiving device Tem is attached a comparator VG and a pulse monitoring circuit TUIII, for decentralized pulse monitoring. The delay circuits VZ1 and VZ2 are described hereinbelow in greater detail in connection with FIGS. 5 through 7. The amplifiers VS1 and VS2 are ordinary pulse amplifiers, and any pulse amplifier providing the desired parameters may be used herewith. The pulse monitoring circuit is described in greater detail hereinbelow in connection with FIG. 8. As indicated by the description herein, comparator VG is a conventional logic circuit for comparing pulse or logic levels for producing a predetermined output upon occurrence of predetermined input signal levels. Such circuits are well known and will not be described in greater detail herein.

The principal manner of operation of the pulse supply system according to the invention is as follows. Both pulse emitters TG operate in parallel, yet independently of each other, and the transmission lines extending from them are separate. The two pulse phases TP1 and TP2 are, therefore, constantly emitted by both pulse generating units TEI and TEII. Since the two pulse emitters TG operate independently of each other, there is no fixed time relation between the pulse phases of the two pulse generating units TEI and TEII. Only the pulse phases TP1 and TP2 of a pulse generating unit are in a fixed, preset time relation one to the other. Under the assumptions that the pulse generating unit TEI represents the active and the pulse generating unit TEII, the reserve unit, and both operate flawlessly, a logical 0 is presented at the output of the bistable stage BKI, which generates the logical 1 over the back coupling input of the stage BKII at its output. The assumed output state is thus designated unambiguously by the logical states 0 and 1 appearing at the outputs of stages BKI and BKII, respectively. In a manner to be described later, these logical states are distributed to the conditioning signals VBI and VBII in the signal emitters SGI and SGII. In the evaluation circuits BW at the pulse receiver it is thereby possible to evaluate the pulse phases of the respective active pulse generating unit and to forward it. Should a change in the logical state from 1 to 0 take place at, at least one of the error inputs FE of the stage BKI attached to the active pulse generating unit, then the logical state of the applicable output is thereby changed. A signal appearing as logical 1 generates now a logical 0 over the back coupling input of the other stage BKII at its output, in case there is no criterion signalling an error at the error inputs FE of this stage. The change of logical criteria at the output of the bistable circuit which appears with the change-over is again distributed to the prepatory signals VBI and VBII. As explained in FIG. 2, the switching off of the previously active unit TEI and the phase-correct switching on of the now active pulse generating unit TEII is initiated. At the pulse receiver, on the basis of the conditioning signals which likewise change, the pulse emitted by the now active pulse generating unit TEII is evaluated and forwarded by the evaluation device BW.

Details of the bistable principle, as well as of the formation of the prepatory signals VBI and VBII are described in the following with the aid of FIGS. 2 and 3.

Figure 2:
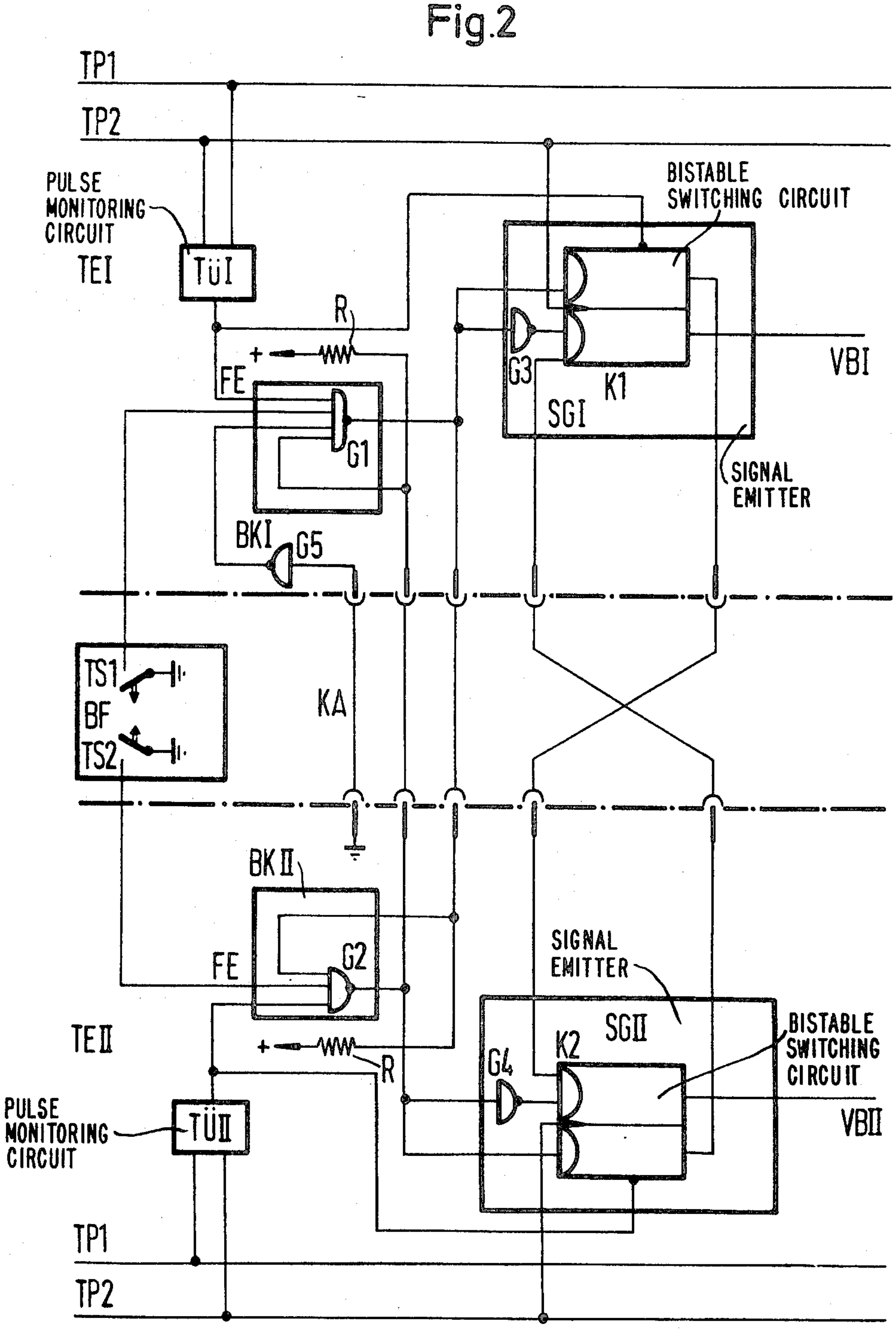
FIG. 2 is a schematic diagram showing details of the connection circuit between the two pulse generating units of the FIG. 1 embodiment, whereby the principle of bistability and the principle of formation of the conditioning signal are emphasized.

In the example of FIG. 2, the stages BKI and BKII, which together form the bistable circuit, are realized through NAND gate circuits G1 and G2. An input to these gates is the back coupling input already described in FIG. 1. Further, inputs to the gates G1 and G2 form the error inputs FE, which among other things, are connected with the pulse monitoring circuits TUI and TUII, for example. In addition, a switching circuit BF is present, in which a manual change-over of the pulse supply can be introduced by keys TS1 and TS2. The outputs of both gates G1 and G2 are back coupled, respectively, to an input of the other gate. The signal emitters SGI and SGII contain in the example of FIG. 2, respectively, a trailing edge controlled bistable switching stages K1 and K2, which are built as so-called Master-Slave bistable stages. These conditioning inputs are realized, respectively, by AND gates and are connected to the stages BKI and BKII such that the stage emitting the conditioning signal, at its output in each stage K1 or K2, receives the inverted output signal of the gates G1 or G2 and a signal delivered by the respective other output of the inversion stage in the other pulse generating unit. The conditioning inputs of the respective other stage of the stages K1 or K2 are directly connected with the output of the gates G1 or G2. To invert the output signal of the gate G1 or G2, the gates G3 and G4 are present, and these can be components of the signal emitters SGI and SGII.

The switching of the bistable stages proceeds with the back-side trailing edge of one of the pulses to be transmitted. In the example described here, this occurs with pulse phase TP2. Every bistable stage K1 and K2 in the signal emitters SGI and SGII has, moreover, an input which can be controlled over the output of the pulse monitoring circuit TUI or TUII, over which, in accordance with the inverted output signal of the respective pulse monitoring circuit, the respective bistable stage can be controlled as well. This results in the possibility that even with a faulty pulse phase TP2 a switching of the applicable bistable stage into such a position as corresponds to the transmission of the blocking conditioning signal is assured.

It should be assumed that the pulse generating unit TEI functions as active unit. In this case, all inputs of the gate G1 of Stage BKI carry a signal corresponding to logical 1. Thereby, the logical 0 appears at the output of the gate G1, whereby the logical 1 appears at the output of gate G2 over the back coupling leading to the back coupling input of the gate G2 in the stage BKII. A signal coupled to one of the error inputs FE in the active pulse generating unit TEI and corresponds to the signal logical 0, which for example was caused by a pulse error, leads to an inversion of the output signal at gate G1, and to an inversion of the output signal over the back coupling input of the other gate G2, in case its error inputs FE carry the signal indicating the errorless operation and corresponding to the signal logical 1. The two stable states of the bistable circuit designate, therefore, in an unambiguous manner, which of the two pulse generating units functions as active unit and which as reserve unit.

To form the conditioning signals VBI and VBII the states at the output of the bistable circuit are coupled to one of the pulse phases to be transmitted; in the example with pulse phase TP2, they are coupled over the two signal emitters SGI and SGII. In explaining this process, reference is made to FIG. 3, in which, in the form of a pulse diagram, the states prevailing at individual selected points of the circuit of FIG. 2 are represented, as a function of time. In lines 1 and 2 therein the pulse phases TPI and TP2 generated by the pulse generator of the first pulse generating unit TEI are shown, in lines 3 and 4, the pulse phases TP1 and TP2 generated by the pulse generator of the second pulse generating unit TEII are shown. It is assumed that at moment to the pulse generating unit TEI functions as the active unit. The output signal at the pulse monitoring circuit TUI, as well as at the gates G1 and G2, which correspond to this state, are shown in lines 6, 7 and 8. Corresponding to the previous explanations, the logical 1 is available at the output of the pulse monitoring circuit TUI, the logical 0 is available at the output of the gate G1, and the logical 1 is available at the output of the gate G2. The bistable stage K1 has been prepared over its conditioning inputs such that it was switched with a trailing edge of the pulse phase TP2 into the one-position. This signal is available as conditioning signal VBI and designates the pulse generating unit TEI as the active unit. The bistable stage K2 in the signal emitter SGII is brought over its previously described conditioning inputs into a position, in which it makes available the signal logical 0 at its output as conditioning signal VBII. The two conditioning signals VBI and VBII are shown in lines 9 and 10 of FIG. 3.

If a pulse error occurs at moment t1, which is expressed, for example, in a change of pulse duration of the pulse phase TP1 of the active pulse generating unit TEI, then this error is recognized in the pulse monitor TUI, and a logical 0 is applied to one of the error inputs FE of the stage BKI. At the output of the gate G1, the logical 1 appears at moment t2, causing, at moment t3, the logical 0 to be available at the output of the gate G2 of the stage BKII. The time shifts occurring in FIG. 3 result from the transit time of the signals in the system. Through the signals available at the gate outputs G1 and G2, the pulse generating unit TEII is now designated as active unit, and the previously active pulse generating unit TEI is designated as reserve unit. The switching of bistable stages K1 and K2 in the signal emitters SGI and SGII, which leads to transmission of the corresponding conditioning signals VBI and VBII. This occurs in such a manner that first the blocking signal and only then the signal designating the pulse of the pulse generating unit TEII to now be evaluated is transmitted. The latter must occur in such a manner that a phase-correct connection of pulse phase TP1 and TP2 of the now active pulse generating unit TEII is caused. Since it can not be precluded that the pulse error in the pulse generating unit TEI has included the pulse phase TP2, the previously mentioned additional control input for the inversion stage K1 is present. This control input keeps K1 stationary in a specific position (in the example in the 0-position) independently of pulse TP2, when a pulse error occurs.

Figure 3:
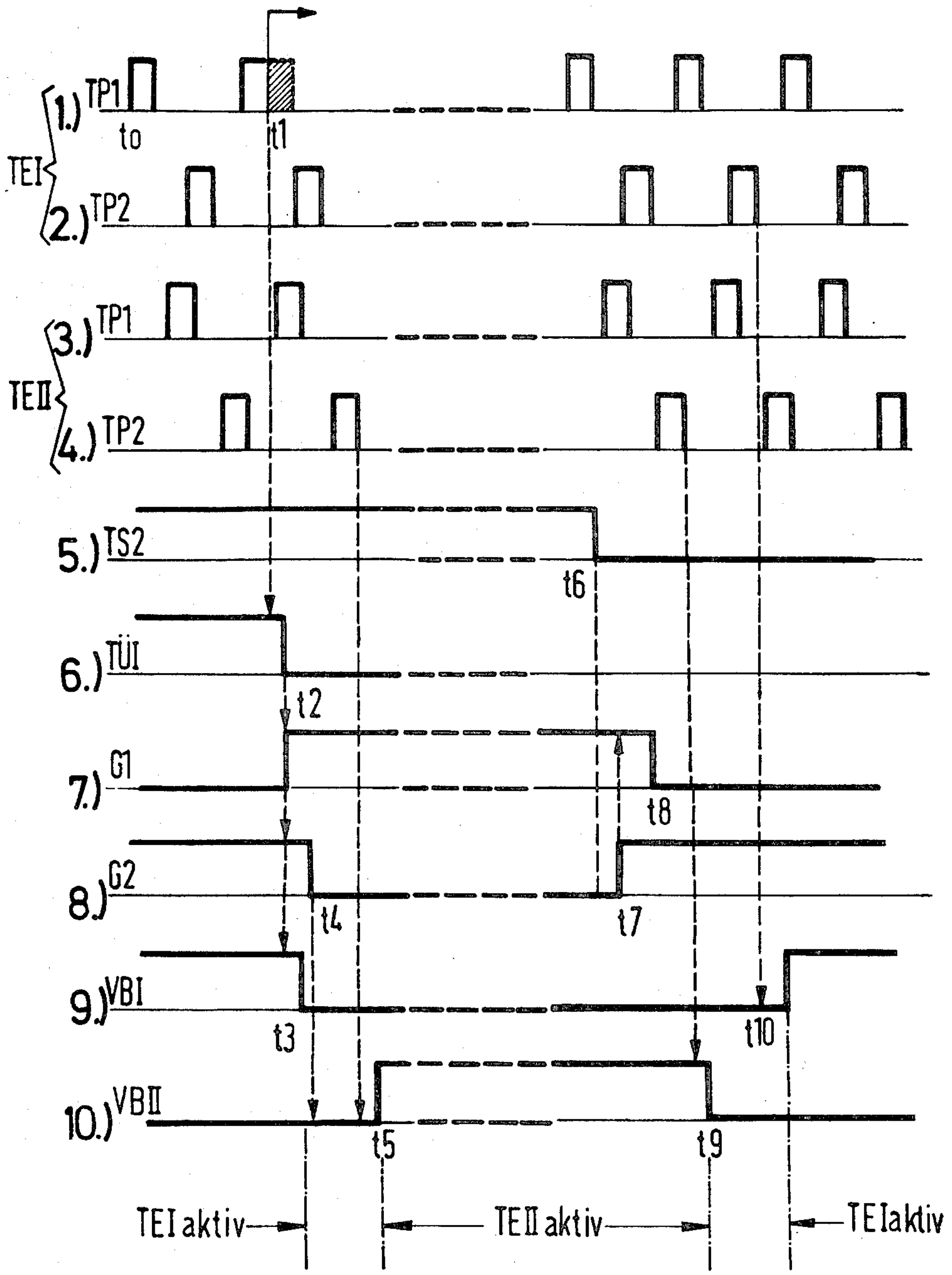
FIG. 3 shows, referring to FIG. 2, a pulse diagram, with which the processes taking place in the arrangement of FIG. 2 are explained in detail.

In FIG. 3, the conditioning signal VBI is transmitted at moment t3 as logical 0, while the conditioning signal VBII, corresponding to the signals at its conditioning inputs, is reversed with the trailing edge of pulse phase TP2 of the pulse generating unit TEII. Thus, at moment t5, signal VBII arrives for transmission as logical 1. Even when the error potential adjoining the error input FE of the bistable stage BKI disappears, this state remains intact as a consequence of the bistability of the two stages BKI and BKII. The switching of stage K1 proceeds in the signal emitter SGI, and therewith the formation of the conditioning signal VBI proceeds directly, over the additional control input through the signals provided by the pulse monitoring circuit TUI. The change of the conditioning signal VBII, thus, the designation of the pulse generating unit, which is now switched on as active unit, occurs, however, in the correct phase. The change of the conditioning signal proceeds first at moment t5 with the trailing edge of the following pulse phase TP2 of the now active pulse generating unit TEII. That guarantees that the conditioning signal VBII of the pulse generating unit to be switched on reaches all pulse receiving units promptly in the pulse pause following pulse phase TP2, such that the now following pulse phase TP1 reaches the corresponding receiving units reliably.

Reference was already made to the fact that the reversal from an active pulse generating unit to a reserve unit is also possible manually, if need be, and that for that purpose, keys are present in a switching circuit. Also, in this case, it is necessary that the transmission of both preparatory signals, i.e., VBI and VBII, occur in a defined manner. This is achieved in that an input of gates G1 and G2 of stages BKI and BKII in the pulse generating units TEI and TEII, respectively, can be reached over a manual control. For the running of these processes, however, one can assume that the pulse phases serving the switching of bistable stages K1 and K2 is available without errors. While the logical 0 is coupled to the conditioning inputs of these inversion stages through activation of one of the keys TS1 or TS2, the switching of the bistable stages can occur, therefore, through the trailing edge of the reference pulse, in this example pulse phase TP2. The processes proceeding then correspond to the principle described already.

In particular, we are dealing with the processes shown in FIG. 3 from moment t6 on. There, it is assumed that at moment t6 in line 5, the key TS2 is activated. Taking into account transit time, at moment t7, the logical 1 appears at the output of gate G2, and therewith, at moment t8, the logical 0 at the output of gate G1, provided that the error inputs FE in the pulse generating unit TEI display a logical 1, corresponding to the error-free state. They are appropriately prepared over the conditioning inputs of stages K1 and K2, in the signal emitters SGI and SGII, and are switched with the trailing edge of the following reference pulse, in the example with the pulse phase TP2. This occurs for inversion stage K1, at moment t9, and for inversion stage K2 at moment t10. At these moments, then, the change of preparatory signals VBI (from 1 to 0) and VBII (from 0 to 1) occurs also. With a manual reversal, e.g., through depressing a key, therefore, there results the blockage of the applicable pulse generating unit phase-correctly, i.e., always after a pulse TP2 last emitted.

In this connection, reference is made to the fact that, instead of trailing edge controlled bistable switching stages, for example, two-stage counting chains can be used, which emit an output impulse first after arrival of the second pulse TP2.

In order to obtain a signal triggering the switching, when there is a loss of supply potential of the respective active pulse generating unit, the back coupling input of each stage BKI and BKII is connected with the supply potential over a resistor R. With loss of the supply potential the logical 0 appears at the applicable input of the gate; therewith, the logical 1 appears at the output of this gate, which leads to the described processes.

In order to prevent, through interruption or removal of a transmission medium connecting the two pulse generating units TEI and TEII, both pulse generating units function as active units. In FIG. 2 a grounded control wire KA is present, which is connected over an additional gate G5 with one of the error inputs of one of the two stages. This particular stage, e.g., the stage BKI in FIG. 2, is then reliably blocked in that a signal corresponding to the signal logical 0 is present at the applicable error input.

The input of the pulse amplifiers TVI and TVII is formed by evaluation circuit BW, which is constructed as an AND-OR- inverter gate G6 or G9. The four respective inputs of gates G6 and G9 carry the corresponding pulse phases of both pulse generating units, as well as the conditioning signals VBI and VBII. To aid comprehension, in FIG. 4, the pulse phases are denoted with TPI1 and TPII1 or TPI2 and TPII2. Assuming that the pulse generating unit TEI is active, the pulse generating unit TEII thus operating as reserve unit, the inverted conditioning signals VBI and VBII coupled to the inputs of the gates G6 and G9 in the evaluation circuits correspond to the logical signals 1 and 0.

One recognizes that during the transmission of the conditioning signal VBI designating the pulse generating unit TEI as active unit, only the pulse transmitted by this pulse generating unit determines the output pulses of gates G6 and G9. If the switching described with the aid of FIG. 3 is introduced and the changed conditioning signal VBI arrives, then no pulse is forwarded, since at this moment the preparatory signal VBII has not been changed. Only when the preparatory signal VBII with changed logical state arrives, are the pulse phases transmitted by the pulse generating unit TEII evaluated and forwarded over the output of the evaluation circuits BW.

Reference was already made to the fact that to compensate for delay time differences, which can occur with exactly equal line lengths, delay devices are present. These are designated as VZ1 in the pulse amplification stages TV11 and TV21 of FIG. 4. The principle that underlies a pulse delay, is explained in the following with the help of FIG. 4, in which individual points are specially denoted for this purpose. The state prevailing at point a of the delay device VZ1 corresponds to the state prevailing at the output of the gate G6 of the evaluation circuit BW. With the arrival of a pulse of the pulse phase TP1 the logical 0 is present, as a consequence of the inverting action of the gate G6, and is forwarded to an input of the succeeding gate G7. The second input of this gate is reached over a delay stage VZS1. Corresponding to an adjustable delay time the logical 0 appears at this input of the gate G7, i.e., at point b delayed. The pulse appearing at point c appears at one input of the following gate G8 and is coupled to the other input over the delay element VZS2. Thereby, there arises at the output of the gate G8; namely, at point k, a pulse delayed with respect to the input pulse. It is obviously possible to construct the delay elements VZS1 and and VZS2 to be adjustable and thus to change the delay times in the amount desired. In this manner, the leading edges, as well as the trailing edges of each pulse phase can be delayed separately in order to meet the requirements of extremely small transit interval variances. In the example at hand the delay of a pulse phase is described with reference to the pulse phase TP1 of the pulse transmitted by the pulse generating unit TEI. Since the delay circuits are of like construction and operate according to the same principle, this description also applies to the other pulse phase.

Figure 5:
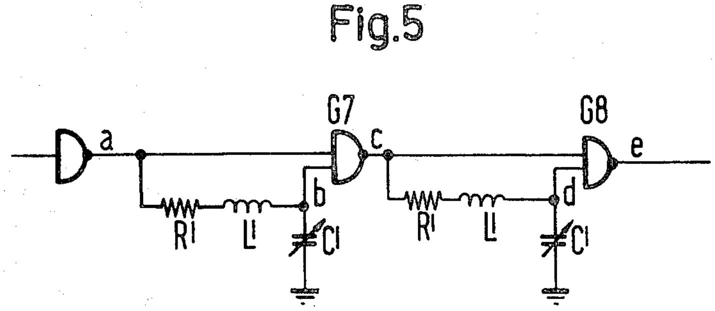
FIGS. 5, 6 and 7 are schematic diagrams of alternative examples of the delay circuits indicated in FIG. 4.
Figure 6:
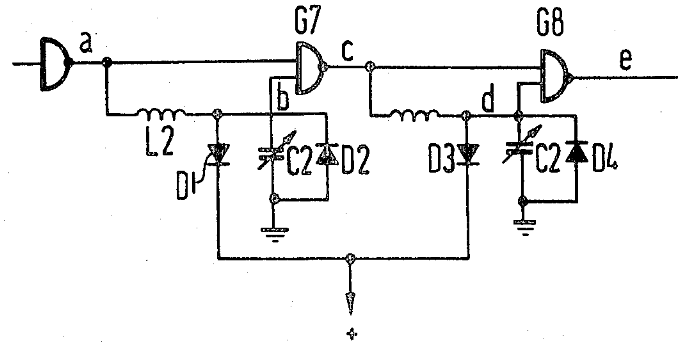
Figure 7:
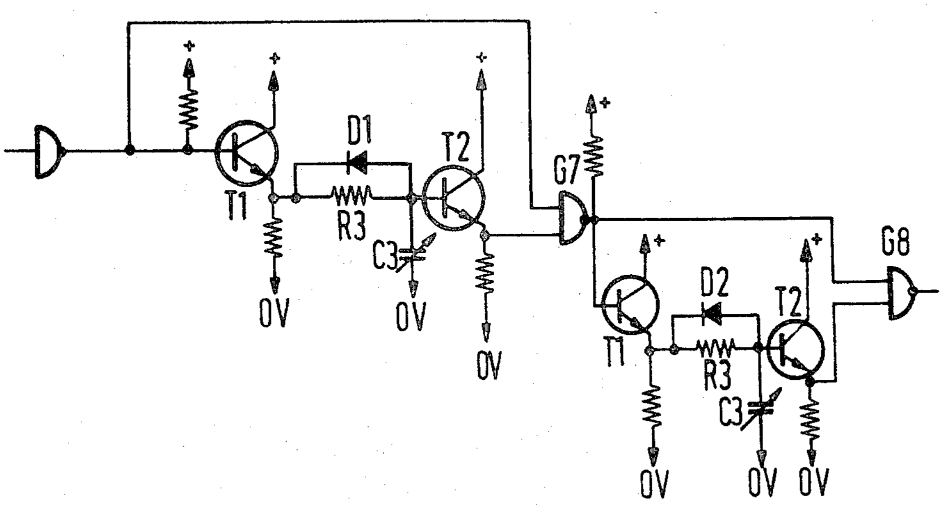

Explanatory examples for the continuously adjustable delay elements VZS1 and VZS2 are shown in FIGS. 5, 6 and 7. In FIG. 5, a LC-element is additionally present, whereby the setting of the delay is achieved by an adjustable condenser C1. Resistors R1 are present to damp the negative and positive excessive oscillations. The proportioning of the inductances L1 and of the resistances R1 is dependent on the duration of the logical 0 at the gate outputs, i.e., on the pulse and pause duration of the pulse to be transmitted, since logical 0 must be achieved at the condensers C1 within this time.

With the circuit shown in FIG. 6, a still smaller delay can be set, since there the resistances R1 are no longer necessary. The limiting occurs here through diodes D2 and D4, given excessive oscillations in the negative direction, and through diodes D1 and D3, given excessive oscillations in the positive direction.

The delay circuit shown in FIG. 7 avoids the disadvantages connected with the use of inductances. The setting of the delay times proceeds through the condensers C1, C2. Through the use of transistors T1 and T2, operated as emitter-followers, there results an especially adaptable circuit.

The pulse appearing at the output of the delay circuits VZ1 are amplified in the amplification circuits VS1 to the point that they have the necessary power to control, for example, 10 following pulse amplification stages TV12 and TV22. Each pulse amplification stage contains in turn delay circuits VZ2 and amplification circuits VS2, which are constructed corresponding to the described principles. The pulses are amplified over the amplification stages VS2, such that, for example, up to 32 pulse gate inputs TGE can be controlled.

Figure 8:
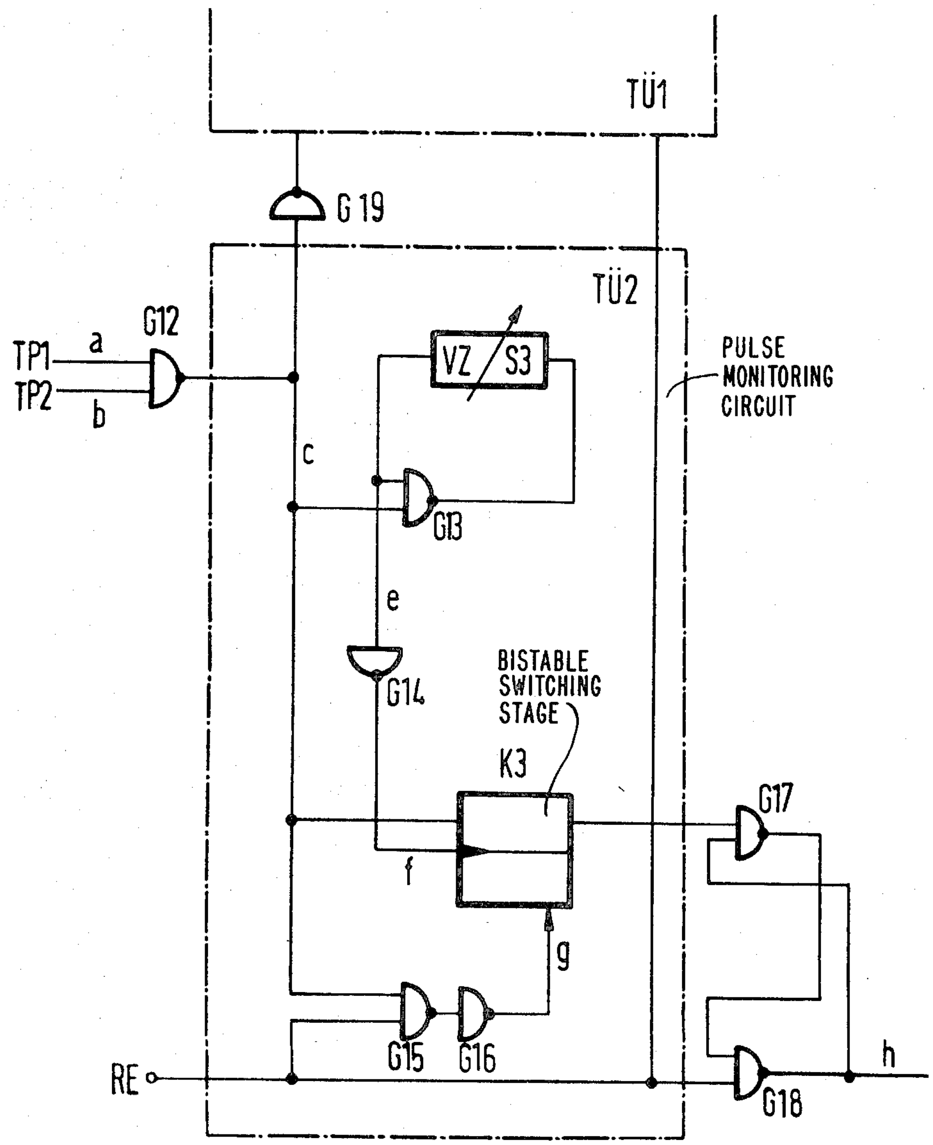
FIG. 8 is a schematic diagram of an exemplary pulse monitoring circuit.
Figure 9:
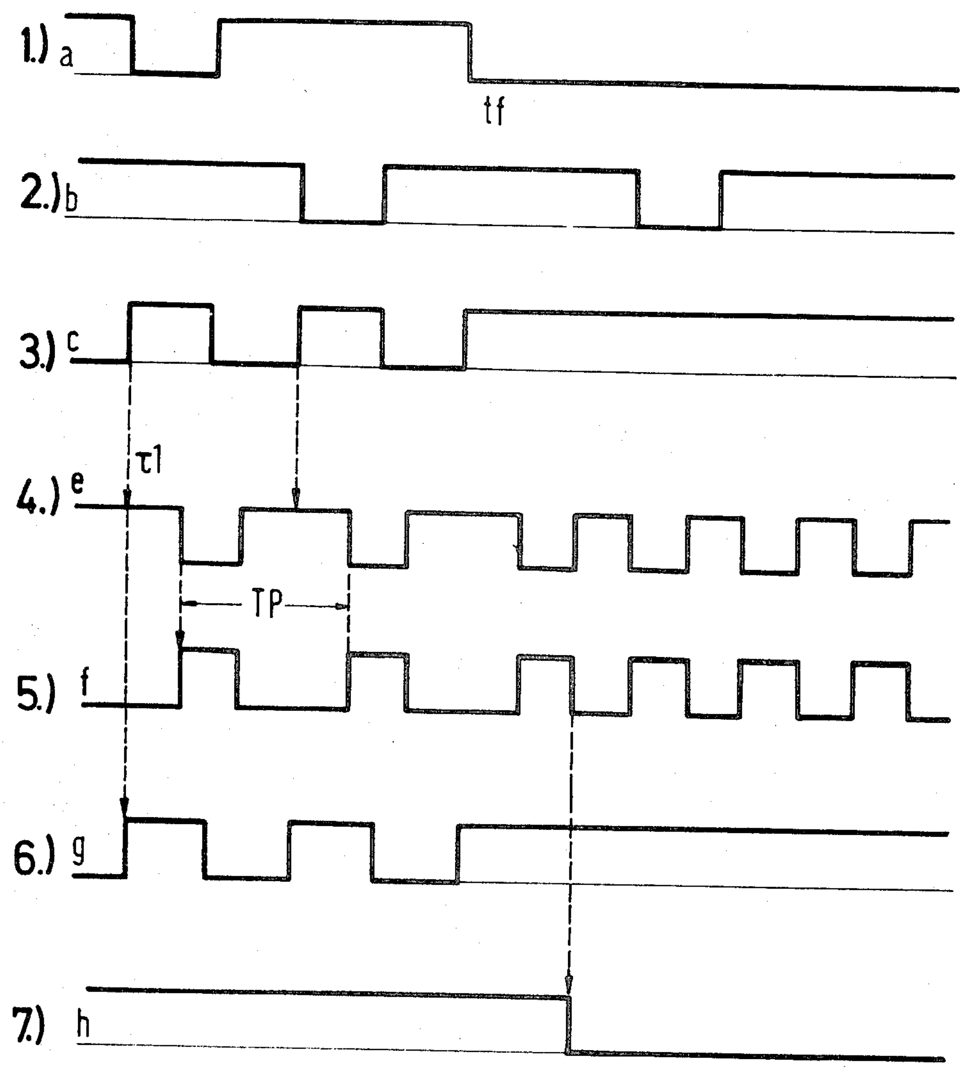
FIG. 9 is a pulse diagram with which the processes taking place in the pulse monitoring circuit of FIG. 8 are described.

Use is made of the principle of time comparison to monitor the pulse phases of the system pulse. A circuit arrangement, which operates according to this principle is contained in the pulse monitoring devices denoted with TU. Reference is made to FIG. 9 to explain the manner of operation. The pulses TP1 and TP2 of a pulse generating unit (lines 1 and 2 in FIG. 9) to be monitored which appear at points a and b in FIG. 8 are brought into play over first gate G12 to form a pulse with a pulse-pause-relationship of 1:1 (point c in FIG. 6; line 3 in FIG. 9). A further gate G13 forms, together with an adjustable delay circuit VZS3, a pulse generator acting as test generator, which delivers test pulses with the period of duration Tp (point *e* of FIG. 8; line 4 in FIG. 9). With each test pulse a testing process is started (point f in FIG. 8; line 5 in FIG. 9). That happens in that after the delay time $\tau$ 1 of the delay circuit VZS3, a trailing edge-controlled switching stage K3 is switched, after being conditioned by the pulse taken from the pulse to be monitored.

Through appropriate choice of the period of duration Tp of the pulse delivered by the pulse generator G13, VZS3, the alternation of the pulse to be monitored proceeds always earlier than the trailing edge of the pulse delivered by the pulse generator. That means that through the control pulses flowing over the gates G15 and G16 (point *g* in FIG. 8; line 6 in FIG. 9) the switching stage K3 is constantly held in its basic position, even when in the sequence the negative-directed pulse edge appears at the pulse input of stage K3. Only when the pulse to be monitored is larger than the pulse delivered by the pulse generator G13, VZS3, which adjoins point *f*, will there arise a pulse at the output of inversion stage K3. This process takes place in the representation of FIG. 9, from moment tf on. At this error moment tf, an error appears in pulse phase TP1, which leads to the result that the pulses at points *c*, *e*, *f* and *g* in FIG. 8 appear in the form shown in FIG. 9, in lines 3, 4, 5 and 6. That means that the pulse controlling stage K3 effects a switching of this stage with its trailing edge. Thereby, an inversion stage built of gates G17 and G18 is reversed in its operating position. As a consequence, an error which arises is reported over the output of the gate G18 with logical 0 (point *h* in FIG. 8; line 7 in FIG. 9) and can trigger the reversal of a stage of the bistable circuit in the applicable pulse generating unit over one of the error inputs.

The monitoring of the pulse pauses of the pulse formed through gate G12 proceeds after inversion through the gate G19 in a pulse monitoring circuit Tu1 in an analogical manner.

A special resetting input RE is present for resetting the stages K3 in the known manner.

Figure 4:
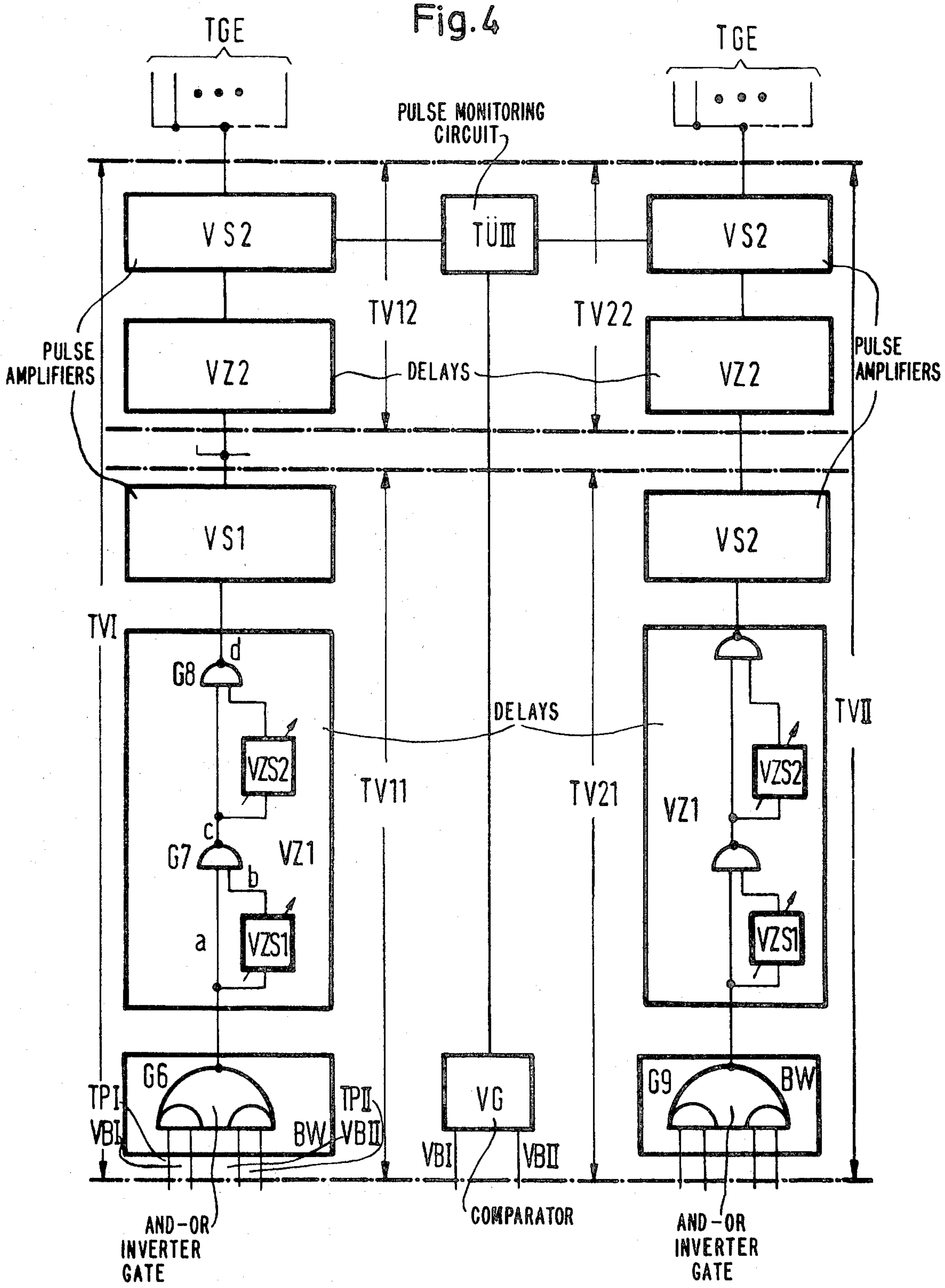
FIG. 4 is a schematic diagram showing the pulse receiving apparatus.

The pulse monitoring according to the described principle is, as shown in FIG. 1 and FIG. 2, present in both pulse generation units TEI and TEII. Among other things, this has the advantage that the two pulse phases TP1 and TP2 are monitored directed at the control lines. Next to it is a decentralized pulse monitor which likewise operates according to this principle and which, as indicated in FIG. 4, is placed at the output of the pulse amplifier. In this way, the pulse monitoring path, including the respective amplifiers in the pulse generating units, is also monitored up to the pulse receiving device. With particular advantage the delay in the pulse generator, which, as described, consists of a gate and a delay circuit, is in this case controlled such that a delayed response results in case of error. Thereby, it is accomplished that in the case of a central pulse error the decentralized pulse monitors, with immediate reversal, no longer respond, in consequence of the blocking of the defective pulse generation.

The blocking effect of the decentralized pulse monitor TUIII can occur in a well-known way. For this reason a detailed description of it is not given herein. For example, it is possible to block the pulse inputs of the apparatus to be supplied through a signal (output signal at the gate G18 of FIG. 8) designating the response of the pulse monitor TUIII. In order to avoid that a pulse pause in the decentralized pulse monitors (TUIII in FIG. 4) caused by the reversing is interpreted as a pulse error, in a further version of the invention, a comparator is provided in the pulse receiving device to which the two conditioning signals VBI and VBII are directed. For further clarification, in this connection reference is made to FIG. 4, where the comparator is marked with VG. Since during the reversal process the conditioning signal VBI, as well as the conditioning signal VBII, offer the same logical state, through a simple connection over the output of the comparator VG of the decentralized pulse monitor TUIII, a signal can be introduced, which during this period of time maintains the inversion stage denoted in FIG. 8 with K3, over the resetting input RE of the pulse monitoring circuit shown in FIG. 8.

The preferred embodiment described hereinabove is intended only to be exemplary of the principles of the invention and is not to be considered as limiting its scope. It is contemplated that numerous modifications to or changes in the preferred embodiment may be made within the scope of the appended claims.

I claim:

1. A pulse supply system having duplicate pulse generating means of like construction and operating in parallel, one of said pulse generating means being in an active state and the other in a reverse state, and having means for switching each said generator from one state to the other, comprising:

transmission means comprising:

a pair of pulse generating means, plural stage bistable circuit means, each stage thereof being coupled to a different one of said pair of pulse generating means, for producing outputs indicative of the levels of said pulse generating means, and plural signal emitter means, each one of which is coupled to a stage of said bistable circuit means, for producing output signals indicative of the levels of each said pulse generating means;

receiving means, comprising:

evaluation circuit means for receiving the outputs from said pulse generating means and said signal emitter output signals for evaluating the pulse phases thereof and for selecting the output from the pulse generating means indicated to be in the active state by said signal emitter output signals and means for forwarding the selected pulse generator output, and means connecting said transmission and said receiving means for communicating said pulse generating means outputs and said signal emitter outputs to said receiving means.

2. The pulse supply system defined in claim 1 wherein each said bistable circuit stage comprises gating means, each said gating means having an input connected to the output of the other gating means, wherein said signal emitter means each include a control circuit connected to a respective gating means output for switching said signal emitters, respectively, responsive to said gating means outputs.

3. The pulse supply system defined in claim 2 further comprising:

first pulse monitoring means for automatically resetting said bistable circuit means.

4. The pulse supply system defined in claim 3 further comprising:

manual switch means for resetting said bistable circuit means.

5. The pulse supply system defined in claim 2 wherein each said control circuit includes two outputs, one of said outputs being connected to said connecting means and the other of said outputs being connected to another input of the other control circuit.

6. The pulse supply system defined in claim 1 further comprising:

delay means interposed in said connecting means for separately delaying the leading and trailing edges of said pulse generating means output.

7. The pulse supply system defined in claim 6 wherein each said delay means is comprised of at least a pair of delay stages for separately delaying the leading and trailing edges of said pulse generating means outputs, each delay stage comprising:

parallel L-C circuit receiving said pulse generator output having an adjustable capacitor and, NAND gating means having an input connected across said adjustable capacitor and another input connected to receive said pulse generating means output, the output from the delay stage being the NAND gate output.

8. The pulse supply system defined in claim 7, further comprising:

diode means connected to each said delay stage for preventing excessive oscillation therein.

9. The pulse supply system defined in claim 6 wherein each said delay stage comprises:

first and second transistors, the base of said first transistor being connected to receive the pulse generating means output and R-C circuit means connecting the emitter of said first transistor to the base of said second transistor, the base emitter junction of said second transistor being connected across the capacitor of said R-C circuit, the output of the delay stage being taken from the emitter of said second transistor.

10. The pulse supply system defined in claim 3 further comprising:

second pulse monitoring means in said receiving means, the number of said second monitoring means corresponding to the number of said pulse generating means, for blocking said pulse generator outputs upon occurrence of pulse error and during change in polarity, and comparator means for controlling said second monitoring means, said comparator means being operated responsive to said signal emitter outputs.

* * * * *